(12) United States Patent
Zafar

(10) Patent No.: US 7,836,120 B2
(45) Date of Patent: Nov. 16, 2010

(54) METHODS AND MEDIA FOR CUSTOM MAPPING B2B TRANSACTIONS IN INFORMATION HANDLING SYSTEMS

(75) Inventor: Haseeb Ahmad Zafar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 12/132,903

(22) Filed: Jun. 4, 2008

(65) Prior Publication Data

US 2009/0307369 A1    Dec. 10, 2009

(51) Int. Cl.
    *G06F 15/16* (2006.01)
(52) U.S. Cl. .............. 709/202; 709/223; 709/227; 709/246
(58) Field of Classification Search ......... 709/201–203, 709/217–219, 223–228, 232, 246
    See application file for complete search history.

(56) References Cited

U.S. PATENT DOCUMENTS

| | | | |
|---|---|---|---|
| 5,931,917 A * | 8/1999 | Nguyen et al. | 709/203 |
| 6,587,827 B1 | 7/2003 | Hennig et al. | |
| 6,658,483 B1 * | 12/2003 | Iwamoto et al. | 709/223 |
| 6,901,440 B1 * | 5/2005 | Bimm et al. | 709/202 |
| 7,231,657 B2 * | 6/2007 | Honarvar et al. | 709/225 |
| 2009/0300199 A1 * | 12/2009 | Burns et al. | 709/227 |

* cited by examiner

*Primary Examiner*—Bharat N Barot
(74) *Attorney, Agent, or Firm*—Garrana Tran, LLP

(57) ABSTRACT

A method for managing communication between businesses includes receiving a request and performing standard mapping on the request. At least one map utilized to map the request into a specified format is determined, and the request is converted into the specified format utilizing the at least one map to form a modified request.

20 Claims, 6 Drawing Sheets

```xml
<?xml version="1.0"?>
<B2BXML>
 <CrossReference>
  <PRODUCTValues PRODUCTId="01" PRODUCTType="ShipTo Address">
   <PRODUCTValue Id="1078">
    <Item Id="ID">
     <Data>1078</Data>
    </Item>
    <Item Id="CompanyName">
     <Data>Customer A</Data>
    </Item>
    <Item Id="Address1">
     <Data>1 Dell Way</Data>
    <Item Id="City">
     <Data>Round Rock</Data>
    </Item>
    <Item Id="StateOrProvince">
     <Data>TX</Data>
    </Item>
    <Item Id="PostalCode">
     <Data>78682</Data>
    </Item>
    <Item Id="Country">
     <Data>US</Data>
    </Item>
    <Item Id="ContactName">
     <Data>Receiving Manager</Data>
    </Item>
    <Item Id="Telephone">
     <Data>5129993355</Data>
    </Item>
    <Item Id="Email">
     <Data />Receiving.Manager@customerA.com<Data />
    </Item>
```

FIG. 5A

```xml
</PRODUCTValue>
<PRODUCTValue Id="1079">
   <Item Id="ID">
     <Data>1079</Data>
   </Item>
   <Item Id="CompanyName">
     <Data>Customer A</Data>
   </Item>
   <Item Id="Address1">
     <Data>1 Dell Avenue</Data>
   </Item>
   <Item Id="City">
     <Data>Round Rock</Data>
   </Item>
   <Item Id="StateOrProvince">
     <Data>TX</Data>
   </Item>
   <Item Id="PostalCode">
     <Data>78682</Data>
   </Item>
   <Item Id="Country">
      <Data>US</Data>
   </Item>
   <Item Id="ContactName">
     <Data>Receiving Manager</Data>
   </Item>
   <Item Id="Telephone">
     <Data>5123355266</Data>
   </Item>
   <Item Id="Email">
     <Data />Receiving.Manager@customerA.com<Data />
   </Item>
     <Description>Standard ShipTo Customer A Ship-to PRODUCT</Description>
 </PRODUCTValue>
 </PRODUCTValues>
</CrossReference>
</B2BXML>
```

*FIG. 5B*

METHODS AND MEDIA FOR CUSTOM MAPPING B2B TRANSACTIONS IN INFORMATION HANDLING SYSTEMS

BACKGROUND

1. Technical Field

The present disclosure relates generally to the field of information handling systems. More specifically, but with limitation, the disclosure relates to electronic transactions between businesses.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business to business (b2b) electronic transactions may be one of the many uses for information handling systems (IHSs). By utilizing IHSs for b2b transactions, businesses may quickly and efficiently conduct electronic transactions with each other, such as sending purchase orders, providing invoices, and performing other business transactions. One of the fundamental problems in integrating b2b electronic transactions for trading partners is the fact that different trading partners may use different procurement and applications to manage b2b transactions. For instance, while trading partners may be using industry standard extensible markup language (XML), xCBL (Common Business Library), hypertext markup language (HTML), electronic data interchange (EDI) message, and other suitable formats to communicate data with each other, the data may be stored by the trading partners in a different fashion. In some cases, a trading partner may format information in a different manner or may utilize identification (ID) codes for product and/or customer related data. For example, a buyer may format a phone number differently than a supplier or may provide an ID code for a delivery address instead of the actual address.

In order for businesses to manage b2b transactions with a trading partner when different procurement or applications are used, the business may need to perform trading partner specific transformations, data mapping, and data cross referencing to convert data into a format desired by the business or a specific trading partner. While b2b servers, such as BizTalk and webMethods, may provide infrastructure to perform these operations, in some situations, b2b servers may not allow trading partner specific operations to be performed without making universal changes to the operations for all trading partners. As a result, a trading partner's sales and deployment teams may request that other trading partner make changes to their method of supplying electronic transactions or may manually process electronic transactions from the buyer, which could potentially cause the trading partner to lose customers.

Thus, a need exists for methods and media for decoupling orchestration and mapping processes in b2b servers, which may allow the execution of trading partner specific custom and library maps with optional cross referencing data.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing communication between businesses. The method includes receiving a request and performing standard mapping on the request. At least one map utilized to map the request into a specified format is determined, and the request is converted into the specified format utilizing the at least one map to form a modified request.

Another aspect of the disclosure provides a computer-readable medium having computer-executable instructions for performing a method for managing communication between businesses. The method includes receiving a request and performing standard mapping on the request. At least one map utilized to map the request into a specified format is determined, and the request is converted into the specified format utilizing the at least one map to form a modified request.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 5A provides part one of an illustrative implementation of a unified data structure; and FIG. 5B provides part two of an illustrative implementation of a unified data structure.

DETAILED DESCRIPTION

Before the present methods and media are described, it is to be understood that this disclosure is not limited to the particular apparatus, methods and media described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" refers to one or several devices, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
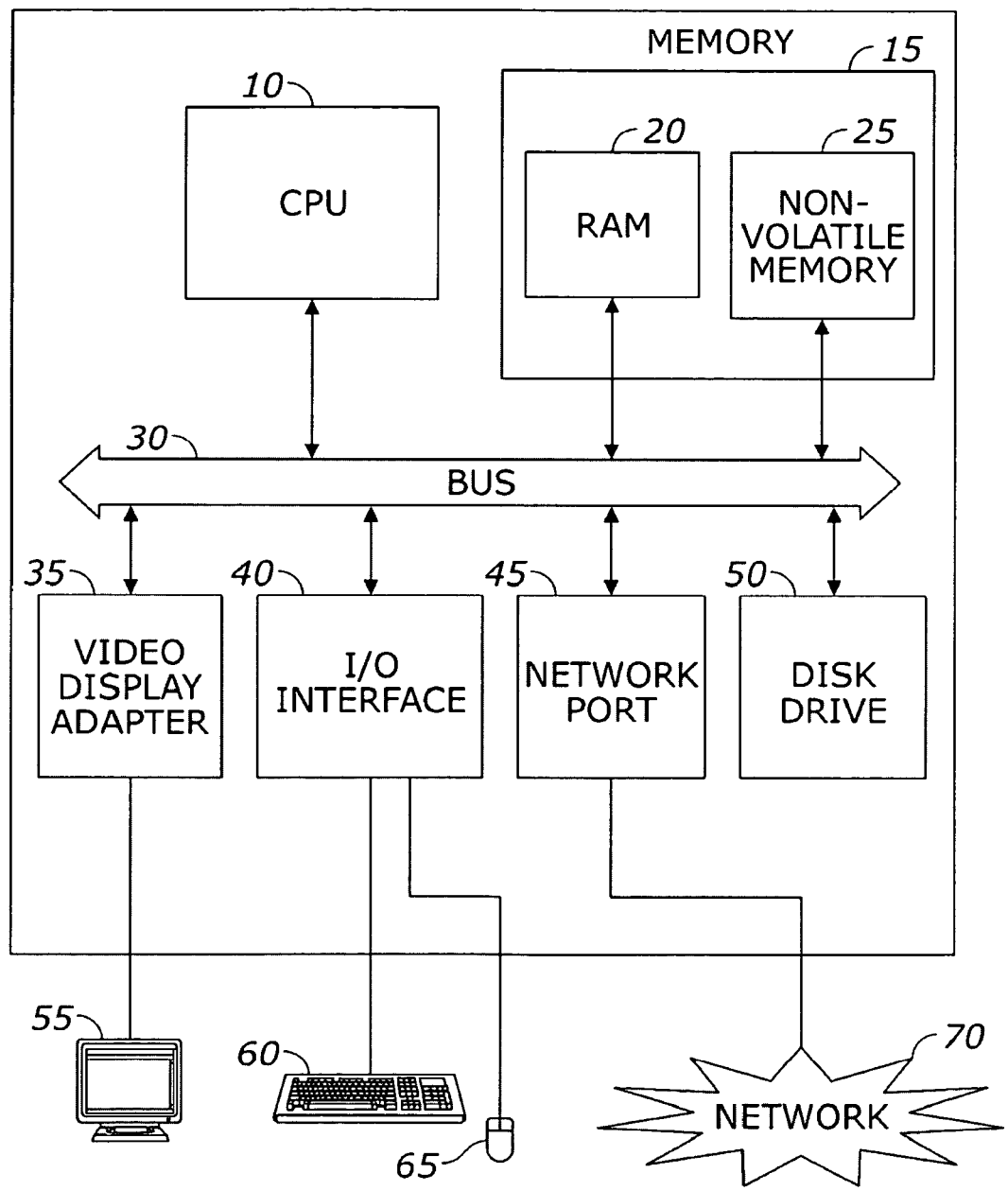
FIG. 1 represents an illustrative schematic of an information handling system (IHS) in accord with the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory 28, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
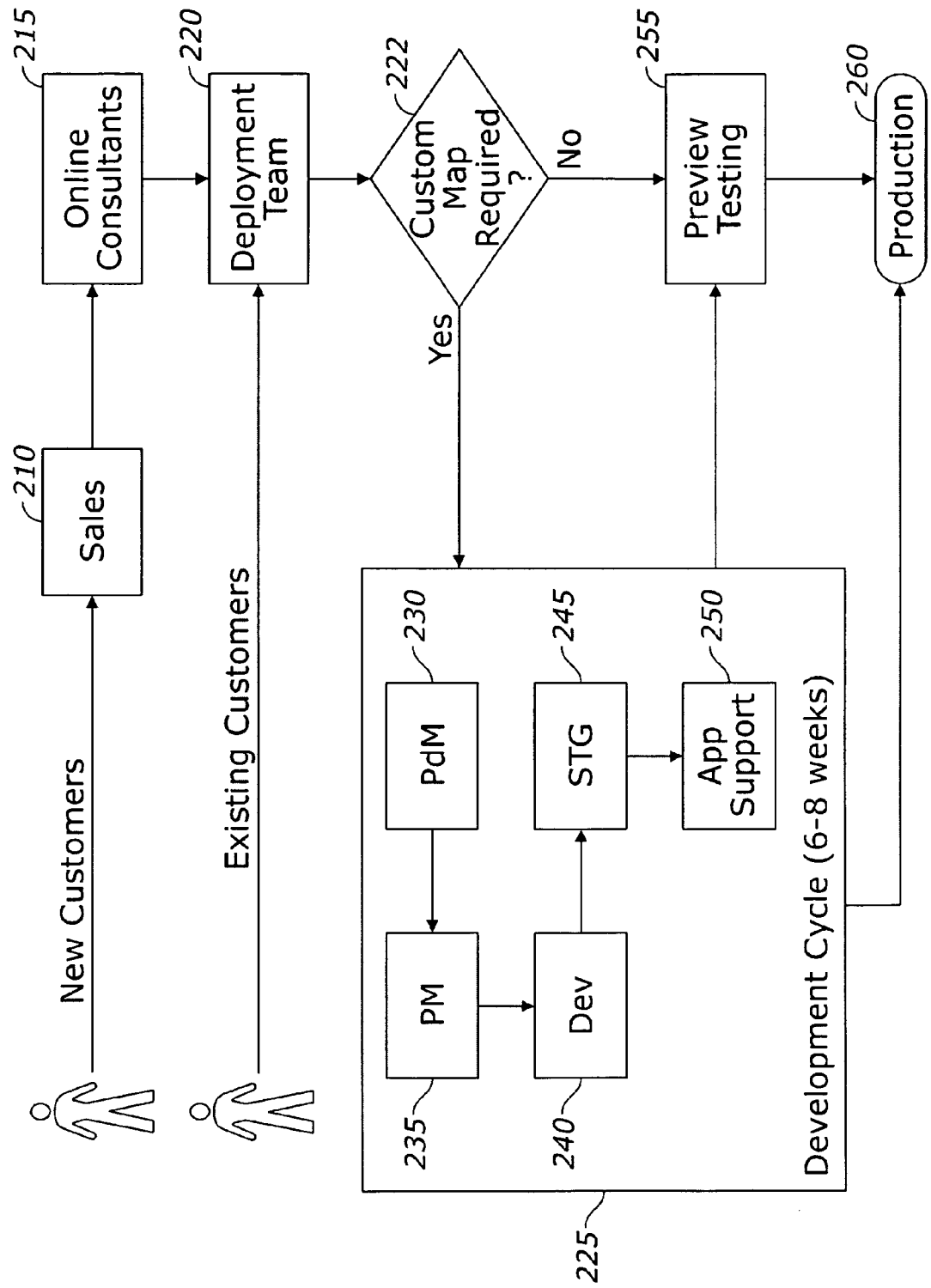
FIG. 2 provides an illustrative implementation of a trading partner b2b integration process.

FIG. 2 provides an illustrative implementation of a trading partner b2b integration process. A trading partner may be a business that conducts business with another business, such as buyer, seller, vendor, supplier, manufacturer, or the like. A trading partner may conduct business with another business electronically or may electronically provide b2b transactions for a transaction. For instance, a trading partner may provide several purchase orders to a business that specify addresses where the goods are to be sent. Each purchase order (PO) may specify a good model number, a shipping address, a telephone number, billing information, and any other suitable information. Because b2b transactions may occur on a massive scale, electronic transmission and processing of the b2b transactions may provide significant efficiency for trading partners. For example, if a trading partner has 1,000 stores nationwide and would like to order 100 widgets to be sent to each store, one PO for 100 widgets for each of the 1,000 stores may be required. By processing these POs electronically, the trading partners may avoid the need to manually fill out and process each PO.

However, one of the issues that may be encountered in establishing b2b transactions between trading partners is a length development cycle when integrating IHSs (herein referred to as b2b systems) of trading partners which may process the b2b transactions electronically. In a trading partner b2b integration process, a new customer may want to conduct business with another company. The customer may contact a sales department in step 210 to get information on the product and to place an order. A sales department may contact online consultants in step 215 to discuss integration with the new customer in step 215. Online consultants for the business may discuss the possibility of electronic b2b transactions with the new customer and may gather integration information from the new customer as well. Integration information may include information utilized to integrating b2b systems of two businesses, such as software and hardware utilized in the b2b systems, data formatting and processing methods, messaging standards, or any other suitable information. For instance, the new customer or trading partner may inform the online consultants of a business how POs will be sent, how the business should sent invoices to the new trading partner, and any other suitable information. Business departments, such as sales and online consultants, may be responsible for running the business operations of a company, and in most cases, do not have technical expertise for b2b systems. By way of example, the business departments for a company may not have the technical expertise to create b2b maps and to deploy b2b maps. The integration information may then be provided to a deployment team in step 220. A deployment team may be a department of a company that interacts with business departments and has the technical expertise to create maps and manage b2b systems for deployment, such as an information technology (IT) department. For existing customers, the process may begin with an existing customer providing integration information to the deployment team in step 220. From this point on the integration process may be the same for existing and new customers.

In step 222, the deployment team may determine if a custom map is required for the new or existing customer by reviewing the integration information. A custom map may indicate how b2b transactions from a customer (e.g., POs or invoices) should be processed by a b2b system receiving the b2b data. Due to difference in the processing and management of b2b data between different trading partners, a custom map may be required for trading partners to conduct electronic b2b transactions. Different trading partners may provide b2b data in different formats, may not send data in the same manner, may utilized identification (ID) codes to cross reference b2b data, or may not provide desired data. By way of example, one partner may use extensible markup language (XML) and the other may use hypertext markup language (HTML), address data may be formatted differently, ID codes may be utilized to lookup data stored at another location, or phone numbers may not be provided. While several conflicts between processing and management of b2b data by different trading partners is disclosed, the present invention is in no way limited to the particular implementations listed. The invention may be utilized for any situation in which conflicts between trading partners in the processing and management of b2b data are present.

If a custom map is not required, preview testing may begin in step 255 (to be described below). If a custom map is required, the custom map development cycle may begin in step 225. In the custom map development cycle, integration information may be provided to a product managers (PdM) group in step 230. A PdM group may interact with an information technology (IT) department and a sales department to determine the criteria for a custom map to be developed. In step 235, the PdM may provide criteria for a custom map to a program manager (PM). A PM may manage projects for an IT department, such as creating new maps. The PM may assign the custom map(s) to be created to a development (Dev) team in step 240. A Dev team may develop custom map(s) necessary to properly process b2b data and/or perform modifications to the b2b system(s) that allow the b2b data to be properly processed. Next, the Dev team may provide the custom map(s) to a software testing group (STG) in step 245. A STG may perform testing to determine if the modifications and custom map(s) from the development team are operating properly. The custom map(s) may then be provided to an application support team in step 250. The development cycle may require several different teams or groups from a company's IT department to interact with the company's business departments, and each time a new custom map is required for an existing or new customer, the deployment cycle may be repeated. Regardless of the complexity of the mapping of b2b data, a custom map development cycle may take several weeks (e.g., 6-8 weeks) to complete. By way of example and not limitation, a first trading partner may format a phone number utilizing parenthesis around an area code, while the second trading partner may not utilize parenthesis around the area code. The second trading partner may wish to remove the parenthesis from the phone number before processing the phone number in a b2b backend system. While custom mapping to remove the parenthesis from phone numbers may appear to be fairly simple, the development cycle may still take several weeks due to the interaction between trading partners, a trading partner's different departments, and a trading partner's integration team and the other trading partner's integration team.

Once software testing is complete, the application support team may perform preview testing in step 255. During preview testing, the trading partners may simulate b2b transactions to insure that the custom mapping is performing correctly. The application support team may then deploy the custom map(s) into production in step 260. In some situations, preview testing may not be necessary or may not be desired allowing the custom map(s) to be deployed into production in step 260 without preview testing of step 250. Once the custom map(s) are deployed, the trading partners may freely conduct b2b transactions.

A virtual runtime providing a global B2B custom mapping and cross referencing tool may facilitate the decoupling of orchestration and mapping processes. By separating the orchestration and mapping processes, the virtual runtime may allow the execution of partner specific custom and library maps along with optional cross reference data. The virtual runtime may provide a framework to a b2b custom map development team for creating and modifying partner specific maps without getting involved in the orchestration logic by allowing the custom maps to be treated as plugins to the virtual runtime. By decoupling the orchestration and mapping processes, the virtual runtime may allow a business department to dynamically control and manage maps, associate the maps with partner profiles, deploy to preview and production environments, and manage cross reference data, while the deployment teams may be responsible for creating the maps. The virtual runtime may allow trading partner(s) specific mapping and transformations without making changes to transformations for all trading partners and gives the ability to provide deployment for these maps without impacting existing standard transformations and maps. The virtual runtime tool may essentially allow a company to let the IT department focus on creating the maps and the business departments to focus on deploy the maps when desired without extensive interaction between the two departments.

Figure 3:
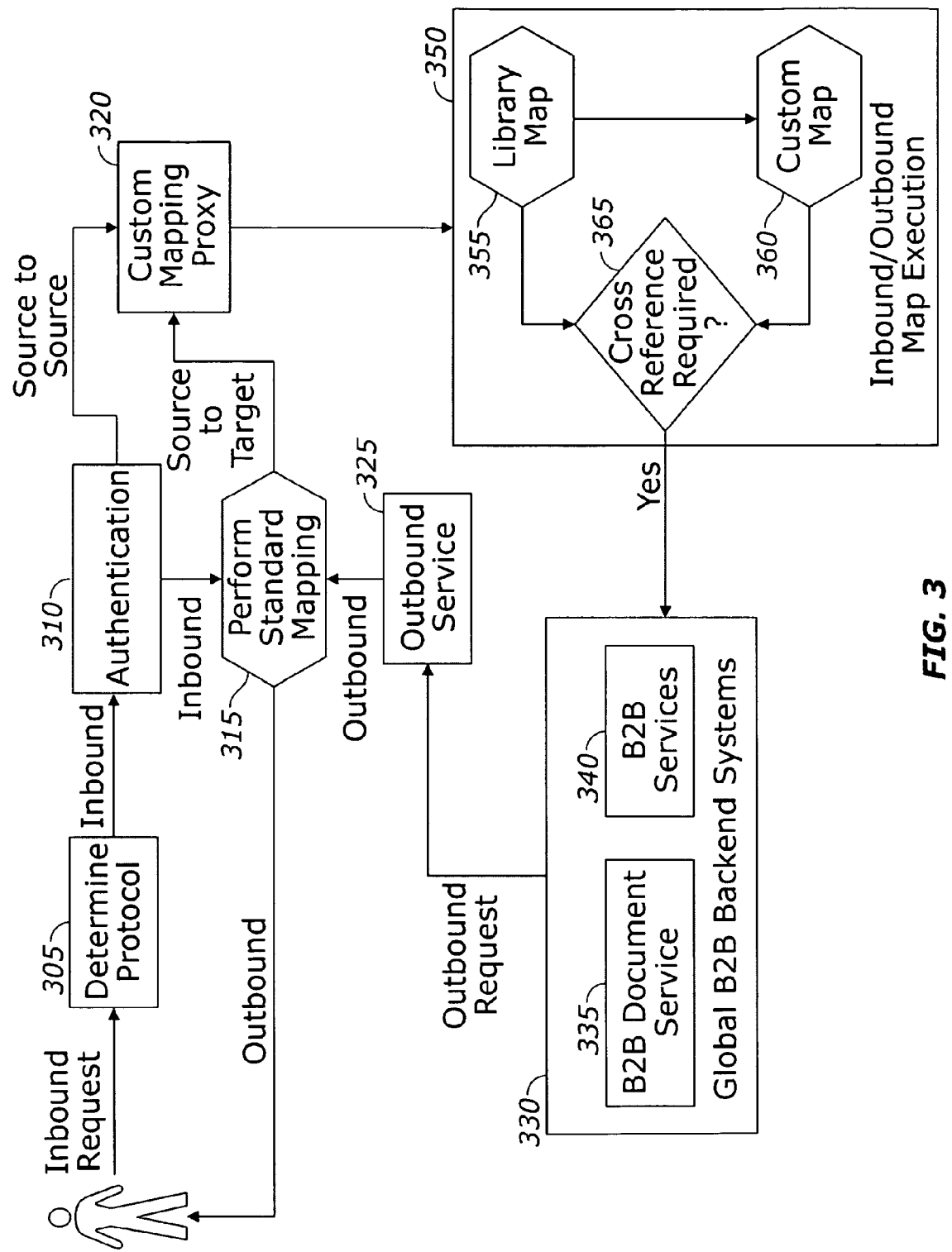
FIG. 3 represents an illustrative implementation of the control flow for a virtual runtime tool for b2b custom mapping.

FIG. 3 represents an illustrative implementation of the control flow for a virtual runtime tool for b2b custom mapping. A virtual runtime tool may receive a request in the form of an inbound or outbound request, such as an inbound or outbound b2b transaction or message, from a trading partner. An inbound request or outbound request may not be in a format desired by the trading partner receiving the request. The virtual runtime tool may allow mapping of inbound and outbound requests, which will be discussed separately, into a desired format. The virtual runtime tool may determine a protocol 305 utilized by an inbound request and the inbound request may be authenticated 310. Industry standards may specify a particular protocol to be utilized to exchange b2b electronic transaction in a specified format, such as XML, HTML, electronic data interchange (EDI), or any suitable protocol. During authentication 310, a specific trading partner providing the inbound request may be identified. An orchestration process may involve arrangement, coordination, and management of complex business processes involving multiple IHSs. Determining the protocol and authenticating the request may be part of the orchestration process, which may be decoupled from the mapping process utilizing the virtual runtime tool. Information gathered during the orchestration process may be utilized to determine the maps to be utilized on the inbound request. Once the inbound request is authenticated and the protocol is determined, standard mapping 315 may be performed on the inbound request accordingly. Standard mapping 315 may include mapping operations that are to be performed on all requests received from a trading partner, such as formatting to convert data from a first protocol, such as commerce XML (cXML), EDI, XML common business library (xCBL), or HTML, to a second protocol, such as XML.

Without a virtual runtime tool, the inbound request may be converted into a desired backend format during standard mapping and the mapping process may be concluded at this point. The backend format, which may utilize one of the specified formats discussed previously (e.g., XML, HTML, and EDI), may represent how a specific trading partner wishes to map or format data for their global b2b backend system 330. However, with the standard mapping process, any modifications to mapping would be applied to all trading partners. Further, any custom mapping to be performed for a specific trading partner without the virtual runtime tool may require the deployment team to go through the development cycle discussed above, which may take at least 6-8 weeks.

With the virtual runtime tool, the mapping process may provide several mapping options. The virtual runtime tool may provide source to source modification utilizing a custom mapping proxy 320. Source to source modification may allow a request to be modified prior to standard mapping. For instance, if an inbound request in a received format (e.g., XML) requires additional data, such as a phone number, then source to source modification may add or delete the addition data to the inbound request in the received format. A custom mapping proxy 320 may be utilized to determine specific maps to be utilized for map execution for a particular request. This may allow the custom maps to be utilized for a particular customer to be selected and modified as desired or dynamically invoked. Without the virtual runtime tool, the maps to be utilized for a particular customer may need to be determined prior to creation of a new map because any modifications to mapping may require the code managing the orchestration and mapping process to be re-written. The virtual runtime tool may allow custom maps to be implemented as plugins to the virtual runtime tool, which may allow a business department to dynamically select the maps to be invoked for each trading partner as needed. For instance, the custom mapping proxy 320 may provide an algorithm utilizing the type of request, the protocol utilized by the request, which trading partner is providing the request, and any other suitable information to determine names or identifiers of mapping(s) to be executed for a particular request. Source to source modification may be desirable when modifying a request prior to the standard mapping process is simpler than modifying request after the standard mapping process. Once source to source modification is performed, standard mapping may be performed on the request and the request may be ready for inbound/outbound map execution 350. The virtual runtime tool may also provide source to target modification utilizing the custom mapping proxy 320. Source to target modification may allow a request to be modified after standard mapping has been performed on the request. Source to target modification may be desirable when modifying a request after the standard mapping process is preferred.

Next, the inbound/outbound map execution 350 may perform mapping operations specified by the custom mapping proxy 320 on inbound or outbound request to format data into a desired format. Maps, such as library maps and custom maps, may provide operations that are performed to convert data from one format to another format. A library map 355 may provide mapping operations which may each be utilized for multiple trading partners. Each library map 355 may be utilized to convert received data into a backend format or convert data to be transmitted into a format desired by the trading partner receiving the data. Library mapping operations in the library map 355, which were identified by the custom mapping proxy 320, for a particular request may be performed on the inbound/outbound request. A custom map 360 may provide custom mapping operations which may be specific to a particular trading partner. A custom map may also map request from a received format to a backend format or from a backend format to a desired outbound format, but the custom map may be specific to one particular trading partner. After the library mapping is performed, custom mapping operations associated with the particular inbound/outbound request may be performed.

A cross reference in an inbound/outbound request may reference data which may be looked up at another location. For instance, a trading partner may provide an identification (ID) code representing a particular address provided in a database rather than provide the actual address. Utilizing the ID code, the address may be looked up from a database and added to the inbound request or an address may be substituted with an ID code for an outbound request. The cross referencing data may be stored in a unified data structure regardless of the type of data. For instance, whether the cross referenced data from a trading partner provides part number data in two columns or an address in seven columns, the cross referenced data may be stored in same data structure. Since both library and custom mapping operations may utilize cross referencing, the virtual runtime tool may determine if any of the mapping operations require the tool to look up cross referencing data 365. Once the cross referencing look up is performed and the cross referenced data 365 is added to the inbound request, the modified request may be in a desired backend format, and the request may be sent to global b2b backend systems 330. A modified request may be an inbound or outbound request that has had library mapping, custom mapping, and/or cross referencing performed to format the data into a desired format for storage on a global b2b backend system 330 or for transmission to a trading partner.

Global b2b backend systems 330 may provide b2b document services 335 and b2b services 340. The b2b services 340 may provide several b2b services, such as shopping requests, PO requests, and several additional services. Once the mapping of an inbound request is complete, the request may be posted to the b2b services 340. The b2b document services 335 may also provide asynchronous services. For instance, a response to a PO, which may not be needed immediately, may be provided by the b2b document services 335.

Services provided by the global b2b backend systems 330 may also send outbound requests to a trading partner. An outbound request may be sent in a backend format to outbound services 325. The outbound services 325 may manage mapping and transmission of outbound requests. As with the inbound requests, standard mapping 315 may be performed on the outbound request. While source to source mapping may not be needed for an outbound request in some situations, source to target mapping may be performed. Source to source mapping may not be needed because the outbound request should be in a desired backend format when the outbound request is provided. The custom mapping proxy 320 may determine the library maps 355 and custom maps 360 utilized to convert the outbound request from a backend format to a format desired by a specific trading partner (e.g., XML, HTML, or EDI) that may receive the outbound request. The outbound request may then be sent to the inbound/outbound map execution 350 to perform the mapping operations determined by the custom mapping proxy 320. Similar to the inbound requests, library map 355 operations may be performed on the outbound request before custom map 360 operations are performed. If cross referencing 365 is utilized by the business providing the outbound request, the cross referenced data may be looked up from a database and inserted into outbound request. In another implementation, a trading partner receiving the outbound request may utilize cross referenced data 365, an ID code representing cross referenced data 365 may be looked up from a database and substituted for the cross referenced data 365 in the outbound request. [is this correct?] Once the mapping of the outbound request is complete, the outbound service 325 may provide the modified request to a specific trading partner.

Figure 4:
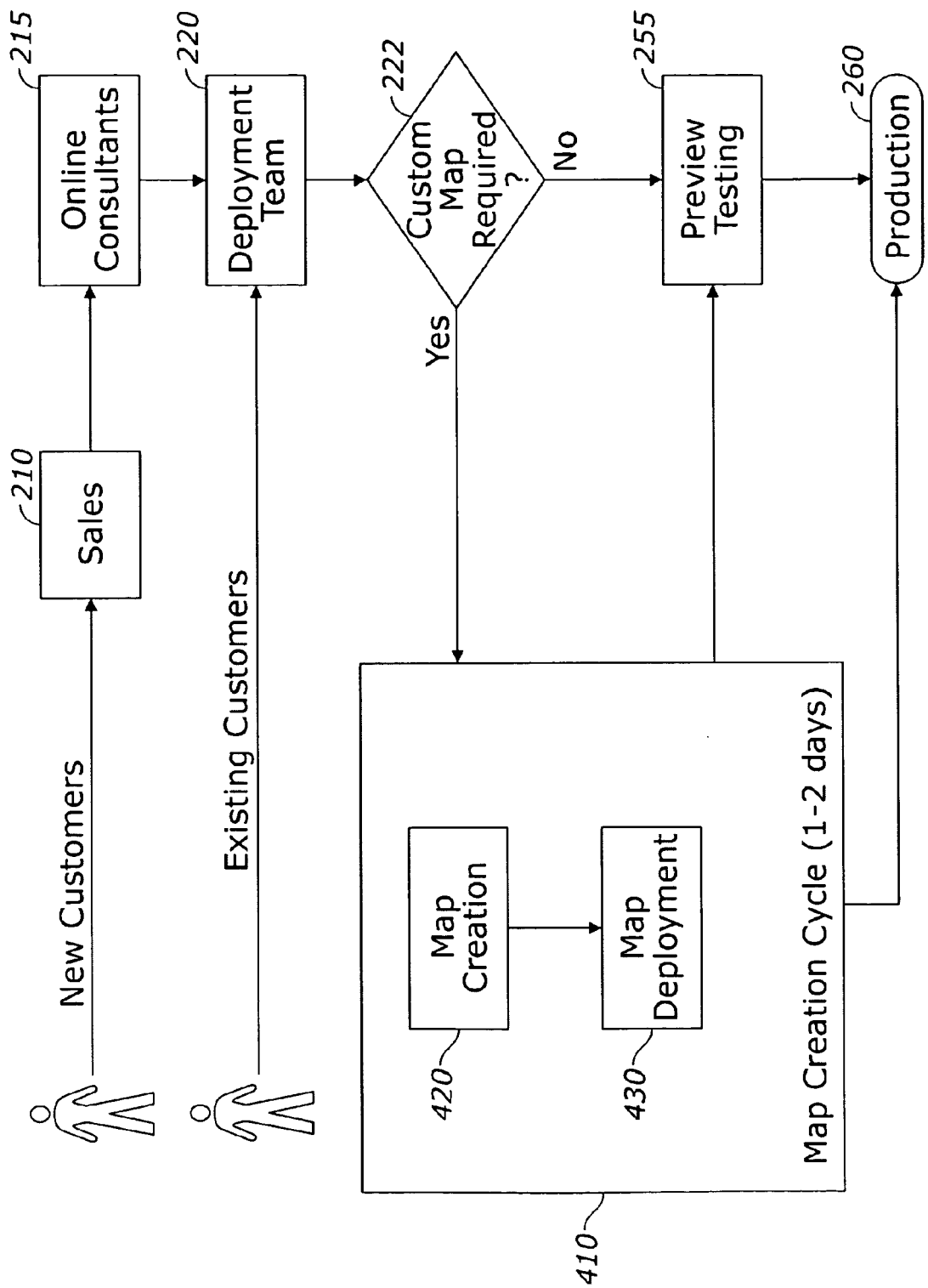
FIG. 4 provides an illustrative implementation of a trading partner b2b integration process utilizing a virtual runtime tool.

FIG. 4 provides an illustrative implementation of a trading partner b2b integration process utilizing a virtual runtime tool. As in the process discussed previously in FIG. 2, new customers proceed through sales department 210, online consulting 220, and a deployment team 220 in a similar manner. Further, an existing customer may interact directly with the deployment team 220. For both new and existing customers, the deployment team 220 may determine if custom mapping is required for the customer 222. If a custom map is not necessary, preview testing 255 and production 260 may be performed. If a custom map is necessary, a map creation cycle 410 utilizing the virtual runtime tool begins. A map creation cycle 410 may include map creation 420 and map deployment 430. By separating the orchestration and mapping processes, an IT department may create maps while business department(s) (e.g., sales and online consultants) may manage dynamic invocation of the maps and integration with a trading partner. The IT department and the business department(s) may operate independently of each other. The deployment team 220 may provide a custom map request to a map developer (e.g., IT department) and a cross reference data format request if cross referencing is utilized. The deployment team 200 may upload and manage the cross referencing data, and map developer may begin map creation 420. Once the map developer had completed the map, the map may be deployed 430 for testing by the map developer. Once the map creation cycle 410 is completed, preview testing 250 may be performed and/or the map be sent to production 260. The benefit that the map creation cycle 410 provides is that it may require as little as one to two days create and deploy a map, which is significantly less time than a development cycle requires.

FIGS. 5A and 5B provide an illustrative implementation of a unified data structure utilized to provide cross referenced data. A unified data structure may be capable of storing several different types of data utilizing the same data structure. For purposes of illustration and not limitation, it may be assumed that customer A may provide contact information for multiple stores that may each associated with an ID code. Each ID code may include several additional attributes, such as a company name, an address, a city, a state, a postal code, a country, a contact name, a phone number, and an email address. An ID code from a request may be utilized to look up contact information associated with the ID code and insert the contact information into the request. For instance, if an ID code equal to 1078 is provided in an inbound request, the contact information associated with the ID code (i.e., Customer A, 1 Dell Way, Round Rock, Tex. 78682, etc.) may be retrieved from the unified data structure and inserted into the request prior to storage on the backend system. In another implementation, an ID code may represent a model number including two additional attributes providing part numbers for two optional parts. While the number of attributes provided may vary for different types of cross referenced data, the data structure utilized to store the cross referenced data may be the same.

In addition to the virtual runtime tool, the custom mapping tools may also provide version controlled custom and library maps and cross reference data management utilizing a unified data structure. These map management tools may provide a fast track partner integration process. A trading partner integration requiring custom maps, which previous took 6-8 weeks, may now be completed in as little as a day. The custom mapping tools may allow one to dynamically invoke custom maps and automate deployment/management of the maps. The custom mapping tools may also allow integration with several different trading partner profiles. Further, the custom mapping tools and maps may be integrated with visual studio team system (VSTS) to manage different versions of the tools and maps.

Various methods are contemplated including all or less than all of the steps described herein and/or mentioned above, any number of repeats or any of the steps shown and/or mentioned above, and performance of the steps in any order.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing communication between businesses utilizing an information handling system (IHS), the method comprising:
   receiving a first request from one of a plurality of first businesses to a second business;
   authenticating the source of said first request;
   based on said authentication, determining at least one of a plurality of maps utilized to map the first request into a first format specified by said one of the plurality of first businesses, wherein the plurality of maps comprise industry standard mapping, a library map relevant to said plurality of first businesses and a custom map relevant to said one of the plurality of first businesses;
   performing a first mapping on the first request to convert the first request into an industry standard format;
   performing a second mapping by utilizing the library map on the first request to further convert the first request into a first format specified by the plurality of first businesses; and
   performing a third mapping by utilizing the custom map on the first request to further convert the first request into the first format specified by the one of the plurality of first businesses.

2. The method of claim 1 further comprising:
   determining a protocol utilized by the first request when the first request is received, wherein the first request is in an extensible markup language (XML), a hypertext markup language (HTML) or an electronic data interchange (EDI) format; and
   authenticating the first request after the protocol is determined, wherein the one of the plurality of first businesses providing the first request is determined.

3. The method of claim 2 further comprising:
   adding additional data to the first request or deleting data from the first request prior to performing the first mapping.

4. The method of claim 2 further comprising:
   adding additional data to the first request or deleting data from the first request after performing the first mapping.

5. The method of claim 1 further comprising:
   identifying the at least one of the plurality of maps based on a protocol utilized by the first request and the one of the plurality of first businesses providing the request, wherein the library map is used by the plurality of the first businesses and the custom map is used by one of the plurality of the first businesses.

6. The method of claim 1 further comprising:
utilizing an identification code associated with a cross referenced data, wherein the cross referenced data is inserted into the first request to convert the first request into a format specified by a backend system or the one of the plurality of the first businesses.

7. The method of claim 1, wherein converting the first request into the first format specified by the one of the plurality of first businesses further comprises:
converting the first request into the first format specified by a backend system.

8. The method of claim 6, wherein the cross referenced data is provided in a unified data structure.

9. The method of claim 6, wherein the first request, into which the cross reference data is inserted, is stored in the backend system when the first request is in a backend format.

10. The method of claim 6, wherein the first request is an outbound request in a backend format, the specified format is an outbound format desired by the one of the plurality of first businesses, and the first request is sent to the first business.

11. A computer-readable medium having computer-executable instructions for performing a method for managing communication between businesses, the method comprising:
receiving a first request from one of a plurality of first businesses to a second business;
performing a first standard mapping on the first request;
determining at least one of a plurality of maps utilized to map the first request into a first format specified by the one of the plurality of first businesses, wherein the plurality of maps comprises a library map and a custom map;
performing a second mapping by utilizing the library map on the first request to convert the first request into the first format specified by the one of the plurality of first businesses, wherein the library map is stored in the computer-readable medium of an information handling system (IHS) of the second business, wherein the second mapping is implemented as a first plugin mapping to the first mapping; and
performing a third mapping by utilizing the custom map on the first request to convert the first request into the first format specified by the one of the plurality of first businesses when the at least one of the plurality of maps is not stored in an information handling system (IHS) of the second business, wherein the third mapping is implemented as a second plugin mapping to the second mapping.

12. The computer-readable medium of claim 11 further comprising:
determining a protocol utilized by the first request when the first request is received, wherein the first request is in an extensible markup language (XML), a hypertext markup language (HTML) or an electronic data interchange (EDI) format; and
authenticating the first request after the protocol is determined, wherein the one of the plurality of first businesses providing the first request is determined.

13. The computer-readable medium of claim 12 further comprising:
adding additional data to the first request or deleting data from the first request prior to performing the first mapping based on the protocol utilized by the first request and the one of the plurality of first businesses providing the first request.

14. The computer-readable medium of claim 12 further comprising:
adding additional data to the first request or deleting data from the first request after performing the first mapping based on the protocol utilized by the first request and the one of the plurality of first businesses providing the first request.

15. The computer-readable medium of claim 11 further comprising:
identifying the at least one of the plurality of maps based on a protocol utilized by the first request and the one of the plurality of first businesses providing the request, wherein the library map is used by the plurality of the first businesses and the custom map is used by one of the plurality of the first businesses.

16. The computer-readable medium of claim 11 further comprising:
utilizing an identification code associated with a cross referenced data, wherein the cross referenced data is inserted into the first request to convert the first request into a format specified by a backend system or the one of the plurality of the first businesses.

17. The computer-readable medium of claim 11, wherein converting the first request into the first format specified by the one of the plurality of first businesses further comprises:
converting the first request into the first format specified by a backend system.

18. The computer-readable medium of claim 16, wherein the cross referenced data is provided in a unified data structure.

19. The computer-readable medium of claim 16, wherein the first request, into which the cross reference data is inserted, is stored in the backend system when the first request is in a backend format.

20. The computer-readable medium of claim 16, wherein the first request is an outbound request in a backend format, the specified format is an outbound format desired by the one of the plurality of first businesses, and the first request is sent to the first business.

* * * * *